June 5, 1956  J. F. MULCAHEY  2,748,522
ARTIFICAL BAIT
Filed Aug. 22, 1955

INVENTOR.
JOHN F. MULCAHEY
BY

2,748,522

ARTIFICIAL BAIT

John F. Mulcahey, East Gary, Ind.

Application August 22, 1955, Serial No. 529,746

7 Claims. (Cl. 43—42.06)

This invention relates to improvements in artificial bait or fish lures, and more particularly to a fish lure that will closely simulate the motion of a small fish or minnow when the lure is pulled through the water.

The primary object of my invention is to provide a fish lure having two compartments, each provided with spaced inlet and outlet means allowing the water to enter into and exit from each compartment separately.

Another object of the invention is to provide means for alternately opening and closing the inlet end of each compartment as the lure is pulled through the water.

A still further object is to furnish a lure of this character having means at the outlet end of each compartment for deflecting that end of the lure at an angle away from the outlet as the water flows through said outlet.

With the foregoing objects outlined and with other objects in view which will appear as the description proceeds, the invention consists in the novel features hereinafter described in detail, illustrated in the accompanying drawing, and more particularly pointed out in the appended claims.

Figure 1:
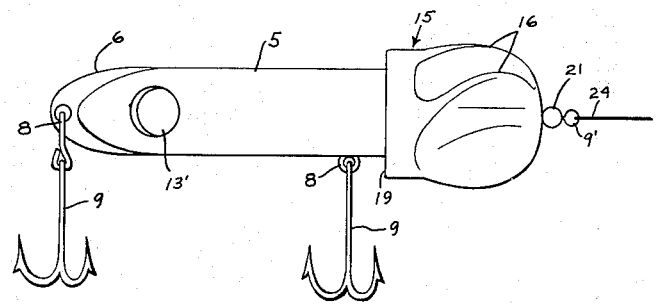
Fig. 1 is a side elevation of my improved fish lure.

Referring to the drawing in detail, 5 designates the body of the lure which may be formed of wood, light metal, plastic or any other suitable material. The body 5 is preferably formed hollow with one end rounded and closed as shown at 6, while its opposite end is open as indicated at 7 in Fig. 2. Loops or rings 8 are secured to the body 5 to receive the fish hooks 9.

Figure 2:
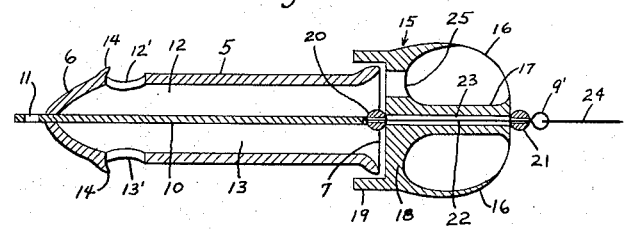
Fig. 2 is a longitudinal sectional view thereof.
Figure 3:
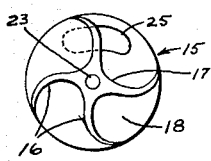
Fig. 3 is a top plan view of the front portion of the lure.

As shown in Fig. 2, the body 5 is provided with an internal longitudinal partition 10 extending throughout the length thereof and, if desired, the partition may extend through the closed end 6 of the body and be provided with an aperture 11 to receive one of the fish hooks 9, in lieu of one of the loops or rings 8. The partition 10 thus divides the interior of the body 5 into two separate compartments 12 and 13 respectively, each being open at one end and closed at its other end.

Each compartment is provided with an outlet 12', 13', formed in the side walls of the body 5, adjacent the closed end 6 of said body. In forming the apertures 12', 13' the material of the body 5 at one end of said apertures is turned outwardly to form a baffle or flange 14 for a purpose hereinafter described. If preferred, the baffle or flange 14 may be formed separately and secured to the body by cementing, welding or any other suitable means.

A headpiece 15 that may be formed of material similar to that of the body 5 or any other suitable material, is rotatably mounted on the open end of said body. The head 15 is shaped like a screw propeller, with screw blades 16 extending outwardly from a central member 17, and upwardly from a base 18, said base having a depending annular flange 19 surrounding and enclosing the open end of the body 5.

For rotatably mounting the head 15 on the body 5, I provide a bearing 20 fixedly mounted on the outer end and centrally of the partition 10, upon which the base portion 18 of the head 15 may rest. A second bearing 21 rests loosely on the outer end of the central member 17 and is spaced from the first bearing by means of a rod or line 22 that extends through a longitudinal slot 23 in the member 17. The leader or fishing line 24 may be secured to a hook 9' attached to the rod 22 extending through the bearing 21 for drawing the lure through the water, and when this happens, the headpiece 15 will revolve on the body 5 as the result of the action of the blades 16 on the water.

The main principle of my invention, as the lure is drawn through the water, is to permit water to enter first in one chamber 12, for example, and exit therefrom, and thence enter into and exit from the second chamber 13. I accomplish this purpose by providing an aperture 25 in the base 18 of the headpiece 15. This aperture is preferably spaced between two adjacent blades 16 and serves to alternately place the headpiece in communication with the two compartments as the headpiece rotates on the body 5.

When the aperture 25 is in alignment with compartment 12, for example, the water will flow into that chamber and exit therefrom through the aperture 12'. As the water seeks to leave compartment 12 through outlet 12', it will strike against the baffle or flange 14, thus causing the rear end of the lure to move out of the horizontal path of the moving lure, and then when the aperture 25 comes into alignment with the compartment 13, and the water entering that chamber seeks to exit from that chamber through outlet 13', the rear end of the lure will be kicked in the opposite direction, these two actions, simulating the action of a swimming fish.

Figure 4:
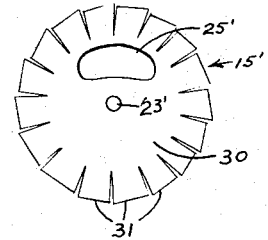
Fig. 4 is a view similar to Fig. 3 but showing a modification of the front portion of the lure.

In Fig. 4 I have shown a simplified form of a headpiece 15' which simply consists of a disc 30 of greater diameter than the diameter of the open end of the body 5. In this embodiment of the invention, the disc, which may be made of any suitable material like the headpiece 15, is rotatably mounted on the body 5 in a manner similar to the mounting of the headpiece 15, except that the rod or line 22 joining the bearings 20 and 21 will be much shorter and will simply extend through the aperture 23' in the center of the disc 30.

The material of the disc 30, outside the periphery of the open end of the body 5, is cut into segmental slits and the material between said slits is bent to form blades 31, the angle of which, when the lure is drawn through the water, will cause said disc to revolve and thus place the aperture 25' in said disc to come into alignment first with one chamber 12 in the body 5 and thence with the other chamber 13 in said body, thus allowing water to alternately enter first one chamber and then the other.

From the foregoing, it is believed that the construction, operation, and advantages of my invention may be readily understood by those skilled in the art, and it is apparent that changes may be made in the details disclosed herein without departing from the spirit of the invention as expressed in the following claims.

What I claim and desire to secure by Letters Patent is:

1. An artificial bait comprising an elongated hollow body closed at one end and open at its other end, a partition dividing the interior of said body into two chambers, each chamber having an outlet means adjacent the closed end of the body, and means rotatably mounted at the open end of said body, and adapted to rotate when the bait is drawn through the water, said means having an aperture therein adapted to be placed in alignment, first with one chamber and then with the other chamber as said means rotates, whereby water will be drawn into each chamber respectively as the bait is drawn through the water.

2. An artificial bait comprising an elongated hollow body closed at one end and open at its other end, a longitudinal partition dividing the interior of said body into two chambers, each chamber having an outlet means adjacent the closed end of the body, and means rotatably mounted at the open end of said body, and adapted to rotate when the bait is drawn through the water, said means having an aperture therein adapted to be placed in alignment, first with one chamber and then with the other chamber as said means rotates, whereby water will be drawn into each chamber respectively as the bait is drawn through the water.

3. An artificial bait comprising an elongated hollow body closed at one end and open at its other end, a longitudinal partition dividing the interior of said body into two chambers, the walls of the body being provided with openings forming an outlet for each of said chambers, a flange extending upwardly from said body, adjacent each outlet, and propeller shaped means rotatably mounted on the outer end of said partition and covering the open end of said body, said means having an aperture for alternately admitting water into one chamber and then into the other chamber as said means rotates when the bait is drawn through the water.

4. In an artificial bait having an elongated hollow body closed at one end and open at its other end, a longitudinal partition dividing the interior of said body into two chambers and having a bearing member fixed to the outer end thereof, the walls of the body being provided with openings adjacent to the closed end of the body and forming an outlet for each of the chambers, a headpiece rotatably mounted on the outer end of said partition and comprising a base portion covering the open end of the body and resting on said bearing member, said base portion having a central aperture formed therethrough, a rod fixed to said bearing member and extending through said central aperture, a second bearing member secured to the opposite end of said rod and spaced from said base portion, said base portion having a second aperture formed therethrough and spaced between said central aperture and the periphery thereof and adapted to register with each of said chambers when the headpiece is rotated, and blades angularly disposed on said base portion for rotating the headpiece when the bait is drawn through the water whereby to permit water to pass through said second aperture into one chamber and thence through said second aperture into the other chamber as the headpiece rotates.

5. In an artificial bait having an elongated hollow body closed at one end and open at its other end, a longitudinal partition dividing the interior of said body into two chambers and having a bearing member fixed to the outer end thereof, the walls of the body being provided with openings adjacent to the closed end of the body and forming an outlet for each of the chambers, a baffle member arranged in each of said openings, a headpiece rotatably mounted on the outer end of said partition and comprising a base portion covering the open end of the body and resting on said bearing member, said base portion having a central aperture formed therethrough, a rod fixed to said bearing member and extending through said central aperture, a second bearing member secured to the opposite end of said rod and spaced from said base portion, said base portion having a second aperture formed therethrough and spaced between said central aperture and the periphery of said base portion and adapted to register with each of said chambers when the headpiece is rotated, and blades angularly disposed on said base portion for rotating the headpiece when the bait is drawn through the water whereby to permit water to pass through said second aperture into one chamber and thence through said second aperture into the other chamber as the headpiece rotates.

6. In an artificial bait having an elongated hollow body closed at one end and open at its other end, a longitudinal partition dividing the interior of said body into two chambers and having a bearing member fixed to the outer end thereof, the walls of the body being provided with openings adjacent to the closed end of the body and forming an outlet for each of the chambers, a headpiece rotatably mounted on the outer end of said partition and comprising a base portion covering the open end of the body and resting on said bearing member, an annular flange depending from said base portion and surrounding the open end of the body, said base portion having a central aperture therethrough, a rod fixed to said bearing member and extending through said central aperture, a second bearing member secured to the opposite end of said rod and spaced from said base portion, said base portion having a second aperture formed therethrough and spaced between said central aperture and the periphery of said base portion and adapted to register with each of said chambers when the headpiece is rotated, and blades angularly disposed on said base portion for rotating the headpiece when the bait is drawn through the water whereby to permit water to pass through said second aperture into one chamber and thence through said second aperture into the other chamber as the headpiece rotates.

7. In an artificial bait having an elongated hollow body closed at one end and open at its other end, a longitudinal partition dividing the interior of said body into two chambers and having a bearing member fixed to the outer end thereof, the walls of the body being provided with openings spaced from but adjacent to the closed end of the body and forming an outlet for each of the chambers, a baffle member arranged adjacent each of said openings, a headpiece rotatably mounted on the outer end of said partition and comprising a base portion covering the open end of the body and resting on said bearing member, an annular flange depending from said base portion and surrounding the open end of the body, a central tubular member extending upwardly from said base portion, a plurality of screw blades extending upwardly from the base portion and outwardly from said tubular member for rotating the headpiece when the bait is drawn through the water, a rod loosely mounted in said tubular member and having one end secured to said bearing member, and a second bearing member secured to the opposite end of said rod and longitudinally spaced from said tubular member, said base portion having an aperture therethrough arranged between two adjacent blades for admitting water first into one of said chambers in the body and then into the other chamber as the headpiece rotates when the bait is drawn through the water.

References Cited in the file of this patent

UNITED STATES PATENTS 2,629,960   Baxter _____ Mar. 3, 1953

FOREIGN PATENTS 39,440   Sweden _____ Sept. 22, 1915